United States Patent [19]
Bertacchi

[11] Patent Number: 5,884,180
[45] Date of Patent: Mar. 16, 1999

[54] METHOD OF PROVIDING A DELAYED CONNECTION ANNOUNCEMENT TO A MOBILE SUBSCRIBER WITHIN A RADIO TELECOMMUNICATION SYSTEM

[75] Inventor: Luciano Bertacchi, Pierrefonds, Canada

[73] Assignee: Telefonaktiebolaget LM Ericsson (publ), Stockholm, Sweden

[21] Appl. No.: 739,794

[22] Filed: Oct. 30, 1996

[51] Int. Cl.$^6$ ............................ H04M 11/00; H04Q 7/00
[52] U.S. Cl. ...................... 455/445; 455/422; 455/433; 455/458; 455/432
[58] Field of Search .................................... 455/422, 426, 455/405, 414, 432, 433, 434, 435, 527, 528, 456, 458, 445

[56] References Cited

U.S. PATENT DOCUMENTS

| | | | |
|---|---|---|---|
| 4,723,273 | 2/1988 | Diesel et al. | 379/211 |
| 4,905,302 | 2/1990 | Childress et al. | 455/34 |
| 5,054,109 | 10/1991 | Blackburn | 455/518 |
| 5,193,203 | 3/1993 | Maeda et al. | 455/528 |
| 5,311,588 | 5/1994 | Polcyn et al. | 370/377 |
| 5,353,340 | 10/1994 | Kunz | 455/432 |
| 5,526,400 | 6/1996 | Nguyen | 455/432 |
| 5,699,407 | 12/1997 | Nguyen | 455/1 |
| 5,711,006 | 1/1998 | Brochu et al. | 455/445 |

FOREIGN PATENT DOCUMENTS

| | | |
|---|---|---|
| 0 545 647 A2 | 10/1991 | European Pat. Off. |
| 0 647 075 A2 | 4/1995 | European Pat. Off. |
| WO 94/17644 | 8/1994 | WIPO |
| WO 96/31073 | 10/1996 | WIPO |

*Primary Examiner*—Willis R. Wolfe
*Assistant Examiner*—Hieu T. Vo
*Attorney, Agent, or Firm*—Steven W. Smith

[57] ABSTRACT

A method is disclosed for alerting a mobile subscriber within a radio telecommunication system to wait for the connection of an incoming call which may have a delayed connection time due to network congestion or the implementation of flexible alerting features utilizing alert-and-answer-before-routing techniques. In flexible alerting extension phone service, each one of a plurality of mobile stations is assigned to a single pilot directory number (PDN), and a home location register (HLR) in an originating exchange maintains a list of parameters identifying each visited mobile switching center (V-MSC) in which mobile stations identified with the PDN are believed to be currently located. The HLR places a forward service indicator code in the routing request messages that it sends to the V-MSCs. After all mobile stations identified with the PDN are paged, voice channels are seized with those that responded. Alerting signals are sent to responding mobile stations, and the V-MSCs transmit a delayed connection message to the answering mobile stations. While the V-MSCs return routing numbers to the HLR, the message may be repeated periodically. If more than one routing number is returned to the HLR, the HLR selects a single mobile station to receive the call. The delayed connection announcement is stopped when a voice trunk is established between the originating MSC and the V-MSC serving the selected mobile station.

13 Claims, 3 Drawing Sheets

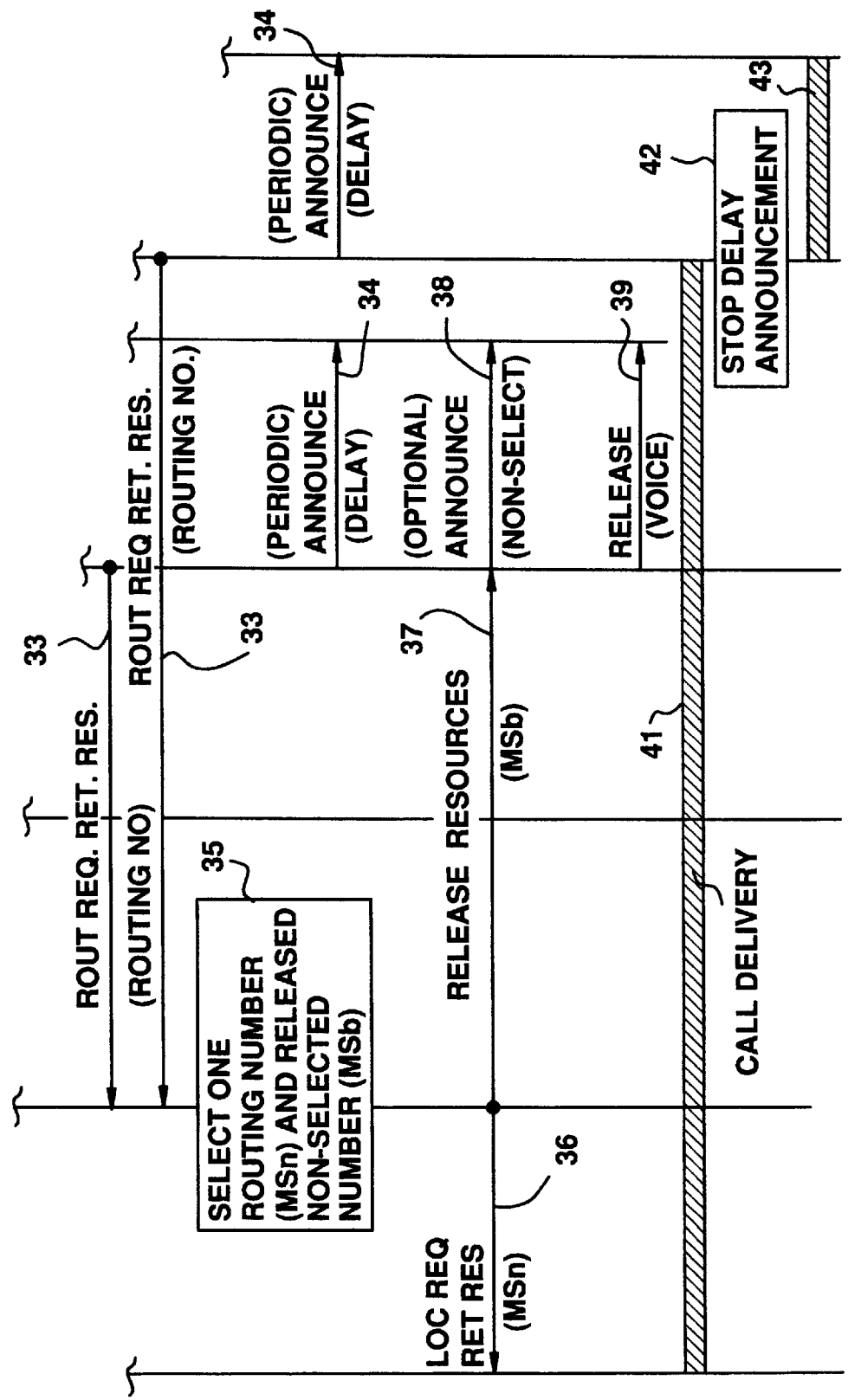

5,884,180

METHOD OF PROVIDING A DELAYED CONNECTION ANNOUNCEMENT TO A MOBILE SUBSCRIBER WITHIN A RADIO TELECOMMUNICATION SYSTEM

BACKGROUND OF THE INVENTION

1. Technical Field of the Invention

This invention relates to radio telecommunication systems, and more particularly, to a method of providing an announcement to a called mobile subscriber indicating that the connection of an incoming call may be delayed.

2. Description of Related Art

In radio telecommunications networks, multiple exchanges may operate together, each exchange being defined as the service area of a mobile switching center (MSC). A mobile subscriber may roam from exchange to exchange, and at any given time, the exchange in which the subscriber is operating is referred to as the serving MSC. An incoming call for the mobile subscriber may originate in an originating MSC and be routed to the serving MSC for delivery to the mobile subscriber.

When an incoming call is received for a mobile subscriber in a radio telecommunication system, a system operator may selectively seize a radio voice channel to the mobile station and alert the mobile subscriber before a voice trunk is established between the originating and serving exchanges. Systems utilizing this alert-and-answer-before-routing feature may experience sigifficant delays between the time that the mobile subscriber is alerted, and the call is delivered. In addition, increased demands on the resources of the cellular system, as well as other commercial services, which use alert-and-answer-before-routing implementation, may lead to unexpected delays in call delivery. As a result, the called party may prematurely terminate the call by hanging up before call delivery is completed, thereby creating a loss of revenue to system operators.

Although there are no known prior art teaching of a solution to the aforementioned deficiency and shortcomings of alerting a called party before establishing a voice trunk U.S. Pat. No. 4,723,273 to Diesel et al (Diesel) discloses subject matter which bears some relation to the matters disclosed herein. Diesel discloses a call forwarding method that allows the called party to selectively forward alerted calls without first establishing a voice channel or requiring the called party to answer the call. This discretionary call forwarding feature utilizes an out-of-band signaling channel to receive and transmit calling party information. Review of Diesel reveals no teaching or suggestion of a system or method such as that disclosed herein for notifying a called party to wait for the delayed connection of an answered incoming call alert.

It would be a distinct advantage to have a method in a radio telecommunication system for notifying a called party to wait for the delayed reception of an incoming call after responding to a call alert, and thereby increase the percentage of completed incoming calls.

SUMMARY OF THE INVENTION

In one aspect, the present invention is a method of delivering an incoming call to a called mobile station in a radio telecommunication system having an originating mobile switching center (MSC), a home location register (HLR), and a visited mobile switching center (V-MSC) in which the called mobile station is operating. The method begins by receiving the incoming call in the originating MSC and informing the V-MSC that the incoming call invokes an alert-and-answer-before-routing feature. This is followed by transmitting an alerting signal from the V-MSC to the called mobile station; transmitting, from the V-MSC to the called mobile station, a delayed connection message when the called mobile station answers the alerting signal; and routing the incoming call to the called mobile station.

In another aspect, the present invention is a method within a radio telecommunication system of notifying a mobile subscriber to wait for the connection of an incoming call which may have a delayed connection time. The radio telecommunication system includes an originating exchange having a home location register (HLR) and an originating mobile switching center (MSC), a plurality of visited mobile switching centers (V-MSCs) and a plurality of mobile stations. Each one of the plurality of mobile stations is assigned to a single pilot directory number (PDN), and the HLR maintains a list of parameters identifying each V-MSC in which at least one mobile station identified with the PDN is believed to be currently located. The method begins by receiving a call directed to the PDN in the HLR from the originating exchange; transmitting, from the HLR, a individual routing request message having a forward service indicator code to each one of the identified V-MSCs; and receiving, in each identified V-MSC, the routing request message having the forward service indicator code. This is followed by paging, from each identified V-MSC, each identified mobile station located therein; receiving, in at least one of the identified V-MSCs, a paging response from at least one of the identified mobile stations located therein; and seizing a voice channel between each identified V-MSC receiving a page response and at least one responding mobile station located therein. The method continues by transmitting an alerting signal from each receiving identified V-MSC to the page-responding mobile stations located therein; determining which of the responding mobile stations answered the alerting signal; and transmitting, from each receiving identified V-MSC, a delayed connection message to the first or more answering mobile stations located therein. Finally, the method concludes by transmitting from each V-MSC having at least one answering mobile station, a routing number for the answering mobile stations to the HLR, and selectively routing the incoming call to one of the answering mobile stations.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
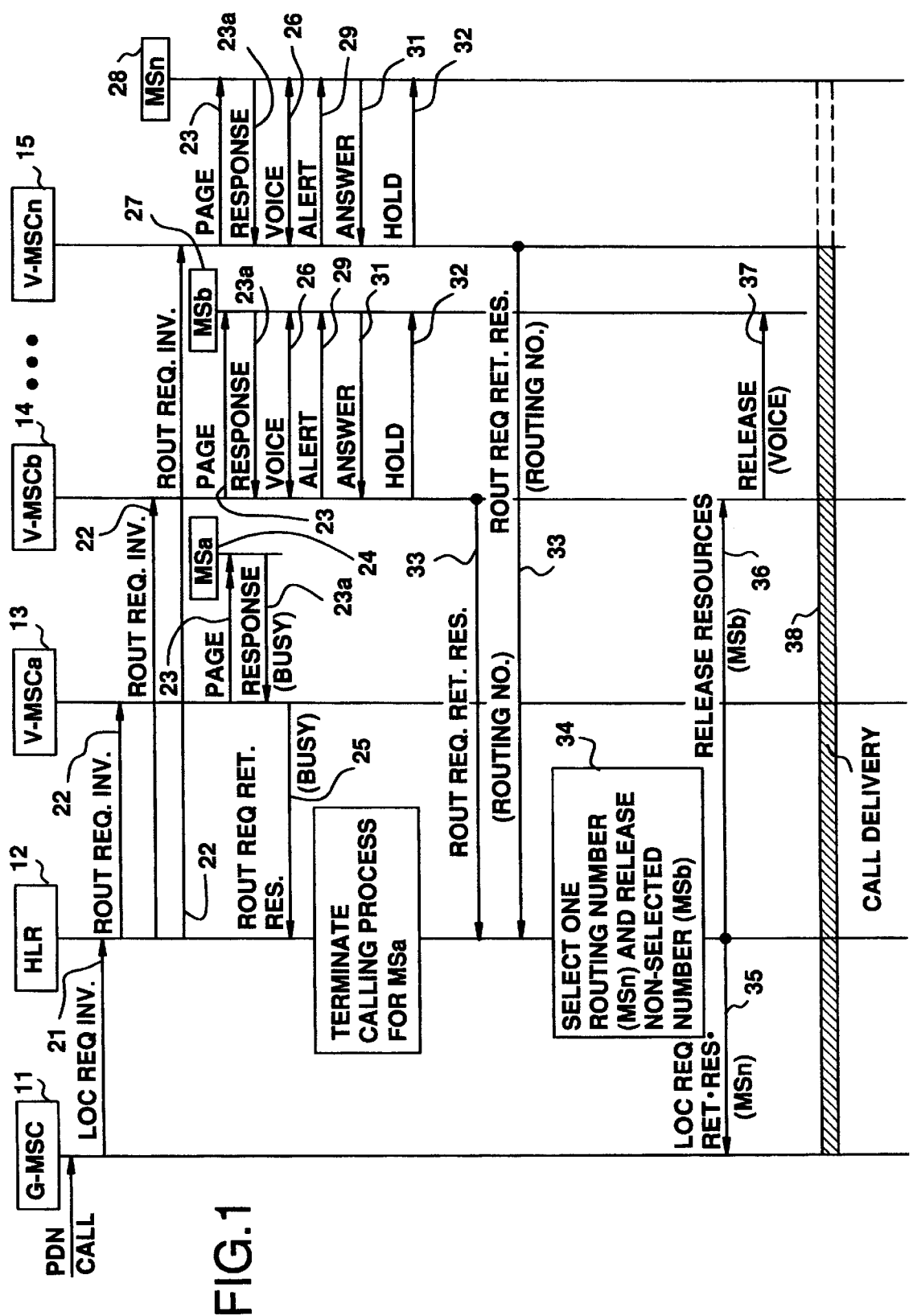
FIG. 1 is a message flow diagram illustrating the flow of messages involved in implementing a flexible alerting extension phone system in a radio telecommunications network.

The present invention is a method of providing an announcement to a called mobile subscriber indicating that the connection of an incoming call may be delayed. Delays may be caused by network congestion or by features, such as hunt groups and flexible alerting, which delay the establishment of a voice trunk between the originating and serving exchanges until after the subscriber answers the incoming call.

An example of an alert-and-answer-before-routing feature is a flexible alerting mobile extension phone service. The extension phone service is implemented by having a single Pilot Directory Number (PDN) assigned to each one of a plurality of mobile stations. A home location register (HLR) maintains a list of parameters for identifying the plurality of mobile stations and their respective locations within the network. Each one of the parameters within the list identifies one of the plurality of mobile stations and one of the plurality of MSCs in which the identified mobile station is believed to be currently located.

When a call to the PDN is received in a gateway mobile switching center (G-MSC), the G-MSC of the originating exchange sends a location request (LOCREQ) invoke message to the HLR. In response, the HLR transmits an individual routing request (ROUTREQ) invoke message to each one of the plurality of MSCs identified as currently serving a mobile station associated with the PDN. Each MSC receiving a ROUTREQ invoke message pages each one of the plurality of associated mobile stations operating within its service area.

Upon receiving a page response from at least one of the plurality of paged mobile stations, each paging MSC seizes a voice channel with the responding mobile station and sends an alert (ringing) signal to the responding mobile station indicating an incoming extension phone call. If the mobile station is active and the subscriber answers the alert signal, the subscriber is put on a silent hold while the MSC sends a ROUTREQ return result message to the HLR with the routing number of the responding mobile station. If a plurality of mobile subscribers answered the call, then more than one routing number, from one or more MSCs, are returned to the HLR. The HLR follows preset criteria to select a single mobile station to complete the call.

The HLR then orders the MSCs to release the seized voice channels with the other, non-selected mobile stations, and the call is then routed to the selected subscriber. The EIT/TIA signaling standards typically followed for incoming calls to a PDN are set forth in Intersystem Signaling Standard IS-41, as well as air interface standards such as IS-54, and IS-136, which are hereby incorporated by reference herein.

One problem with systems utilizing this and other alert-and-answer-before-routing features, is that the voice connection with the calling party is delayed, and the called party may prematurely terminate the call by hanging up before call delivery is completed. The flexible alerting feature of the extension phone service described above involves simultaneously paging and alerting several cellular subscribers located in multiple serving exchanges before connecting a voice trunk between the originating MSC and serving MSC. Once a called subscriber answers, the network stops alerting the other remaining subscribers and establishes a voice trunk between the originating MSC and the selected serving MSC. While the voice trunk is being set-up, however, the called party does not hear the calling party and may prematurely hang-up during the delayed reception of the incoming call.

Referring first to FIG. 1, there is illustrated a message flow diagram illustrating the flow of messages involved in implementing a flexible alerting extension phone system in a radio telecommunications network. A G-MSC 11, an HLR 12, and a plurality of V-MSCs 13–17 are illustrated. Upon the receipt of a call to be terminated in a group of mobile stations associated with a PDN, the G-MSC 11 of the calling station sends a location request message 21 to the HLR 12. The HLR 12, in tun, transmits routing request messages 22 to all V-MSCs 13–15 where the mobile stations may be located. The V-MSCs send out paging signals to the mobile stations in their respective service areas at 23, and may receive page responses 23a. If an associated mobile station, for example MSa 24 in V-MSCa (13) is busy, then V-MSCa notifies the HLR 12 of the "busy" condition at 25. The calling process for MSa is then terminated. Likewise, if there is no page response from MSa, then V-MSCa notifies the HLR 12 of the "non-responding" condition, and the calling process for MSa is again terminated.

Entire V-MSCs may be terminated from the calling process if all the associated mobile stations in a V-MSC are busy, or if none of the non-busy mobile stations responds to a page from the V-MSC.

If the remaining mobile stations respond to the pages, then their respective V-MSCs, for example V-MSCb and V-MSCn, connect radio voice channels 26 to MSb 27 and MSn 28. V-MSCb and V-MSCn then send an alert message (that is, the ringing tone) to the mobile stations at 29. For user convenience, a distinctive ringing tone may be employed to signify that the call being placed is a PDN call instead of a normal call.

If the subscribers of terminating mobile stations in V-MSCb and V-MSCn answer the phone in response to the ringing tone at 31, V-MSCb and V-MSCn first put the subscriber on hold at 32, and then return the subscriber's roamer routing number at 33 to the HLR 12. On the other hand, if a terminating subscriber does not answer the call, that mobile station is removed from the calling process by the HLR after a predetermined period. Upon the receipt of the roamer routing numbers, the HLR 12 selects one routing number at 34 based on a selection criterion such as (i) first to answer; (ii) nearest location; or (iii) a pre-defined priority algorithm.

Once a roamer routing number is selected, the HLR 12 returns the selected roamer routing number (for example MSn) at 35, to the G-MSC 11 of the calling station, and sends a Release Resources message 36 to non-selected V-MSCs. The voice channels to the mobile stations not selected (for example MSb) are released at 37. At 38, the G-MSC routes the call to the V-MSC of the selected roamer number, for example V-MSCn, which in turn sets up the call for conversation.

Figure 2A:
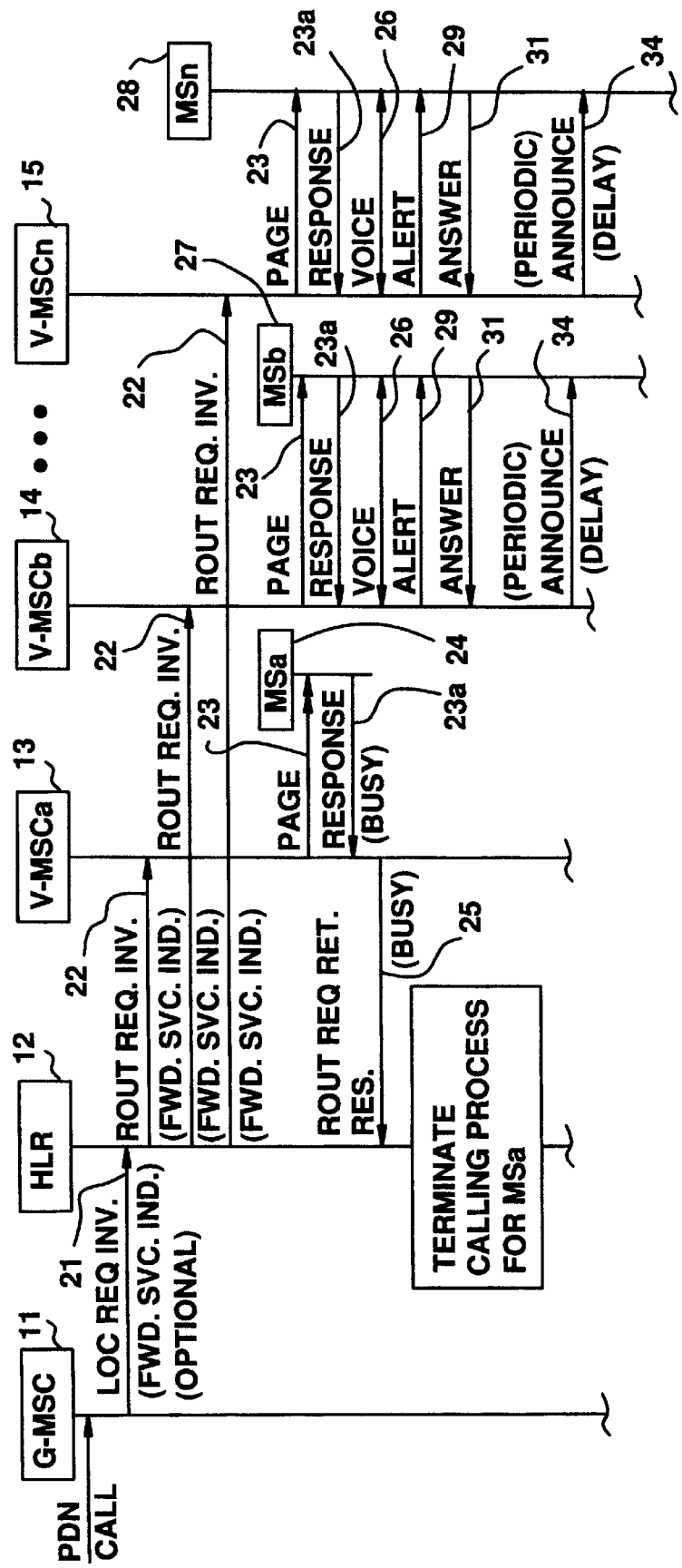
FIG. 2 is a message flow diagram illustrating the flow of messages utilized in the preferred embodiment of the present invention when implementing a delayed connection message to called subscribers utilizing the flexible alerting extension phone system of FIG. 1.

Referring now to FIG. 2, there is illustrated a message flow diagram illustrating the flow of messages utilized in the preferred embodiment of the present invention when implementing a delayed connection message to called subscribers utilizing the flexible alerting extension phone system of FIG. 1. It should be understood that while the preferred embodiment of the present invention is shown to be associated with a flexible alerting extension phone system, the invention is equally applicable to any type of call which may experience a delay between the alerting of the called subscriber and the connection of the call. A G-MSC 11, an HLR 12, and a plurality of V-MSCs 13–17 are illustrated. Upon the receipt of a call which invokes an alert-and-answer-before-routing feature (for example, a call to be terminated in a group of mobile stations associated with a PDN), the originating G-MSC 11 of the calling station sends a location request message 21 to the HLR 12. In the preferred embodiment, the HLR then determines that the call invokes an alert-and-answer-before-routing feature, and includes a forward service indicator code in the routing request messages 22 identifying the call as one requiring an announcement toward the called mobile station that the connection of the call may be delayed.

In an alternative embodiment, the G-MSC may optionally include the forward service indicator code in the location request message 21, thereby identifying the call as one requiring an announcement toward the called mobile station that the connection of the call may be delayed. Thus, if location request messages must be sent to more than one HLR, each HLR is informed that the call requires an announcement toward the called mobile station that the connection of the call may be delayed.

In a second alternative embodiment, each V-MSC 13–15 is programmed to recognize that every long distance call invokes an alert-and-answer-before-routing feature, since most long distance calls require more time to set up than local calls. When the V-MSC receives a routing request message 22 from the HLR 12, the incoming call is identified as a long distance call. Therefore, the V-MSC sends an announcement toward the called mobile station that the connection of the call may be delayed.

Following the receipt of the routing request messages 22 at V-MSCa-n 13–15, the V-MSCs send out paging signals to the mobile stations in their respective service areas at 23, and may receive page responses 23a. For mobile stations responding to the pages, their respective V-MSCs, for example V-MSCb and V-MSCn, connect radio voice channels 26 to the mobile stations. The V-MSCs then send an alert message (that is, the ringing tone) to the mobile stations at 29. For user convenience, a distinctive ringing tone may be employed to signify that the call being placed is a PDN call instead of a normal call.

If the subscribers of terminating mobile stations in V-MSCb and V-MSCn answer the phone in response to the ringing tone at 31, V-MSCb and V-MSCn are programmed to begin an announcement 34 over the seized voice channels 26 to the answering mobile stations. The announcement informs the subscribers that there may be a delay in completing call setup. This announcement may be a one-time announcement, or may be repeated periodically as needed. In the preferred embodiment, the announcement is a voice announcement, however, a signaling message over the air interface may also be used. The V-MSCs then return the subscriber's roamer routing number at 33 to the HLR 12. Upon the receipt of the roamer routing numbers, the HLR 12 selects one routing number at 35 based on a selection criterion such as (i) first to answer; (ii) nearest location; or (iii) a pre-defined priority algorithm.

Once a roamer routing number is selected, the HLR 12 returns the selected roamer routing number (for example MSn) at 36, to the G-MSC 11 of the calling station, and sends a Release Resources message 37 to non-selected V-MSCs. The voice channels to the mobile stations not selected (for example MSb) are released at 39. Optionally, at 38, V-MSCb may be programmed to send a second announcement to MSb announcing that MSb has not been selected, and the call is being routed to another mobile station. The voice channel to MSb is then released at 39. At 41, the G-MSC routes the call to the V-MSC of the selected roamer number, for example V-MSCn. V-MSCn then stops the call-setup delay announcement at 42, and sets up the call for conversation at 43.

The method illustrated in FIG. 2 may be selectively utilized by system operators in connection with cellular system features such as hunt groups and flexible alerting, in which delays may be incurred between a called party's answer and connection of a voice trunk between the calling and called parties. Each V-MSC is modified to send an announcement to mobile stations associated with a PDN stating that call connection may be delayed. In this manner, called subscribers are more likely to remain on the line until call delivery is completed. The delayed connection message may be sent at the same time the V-MSC sends a routing number for the answering mobile stations to the HLR. Optionally, the delayed connection message may be repeated periodically until the voice trunk is established between the originating MSC and the V-MSC.

The V-MSC may be prompted to send the delayed connection message by including a forward service indicator code in the routing request message from the HLR. The HLR adds the forward service indicator code when the incoming call is to a PDN. Alternatively, the operator may select to use the delayed connection message during high congestion times when call connection times exceed a predefined threshold.

It is thus believed that the operation and construction of the present invention will be apparent from the foregoing description. The method, apparatus and system shown and described has been characterized as being preferred. However, it will be readily apparent that while the preferred embodiment of the present invention is shown to be associated with a flexible alerting extension phone system, the invention is equally applicable to any type of call which may experience a delay between the alerting of the called subscriber and the connection of the call. Thus, various changes and modifications could be made therein without departing from the spirit and scope of the invention as defined in the following claims.

What is claimed is:

1. A method of delivering an incoming call to a called mobile station in a radio telecommunication system having an originating mobile switching center (MSC), a home location register (HLR), and a visited mobile switching center (V-MSC) in which said called mobile station is operating, said method comprising the steps of:

receiving said incoming call in said originating MSC;

informing said V-MSC that said incoming call invokes an alert-and-answer-before-routing feature;

transmitting an alerting signal from said V-MSC to said called mobile station prior to routing the call to the V-MSC;

transmitting, from said V-MSC to said called mobile station, a delayed connection message when said called mobile station answers said alerting signal, and prior to routine the call to the V-MSC; and routing said incoming call to said called mobile station.

2. The method of delivering an incoming call to a called mobile station in a radio telecommunication system of claim 1 wherein said step of informing said V-MSC that said incoming call invokes an alert-and-answer-before-routing feature includes the steps of:

transmitting, from said originating MSC to said HLR, a location request message requesting a location of said called mobile station;

determining, within said HLR, whether said incoming call invokes an alert-and-answer-before-routing feature;

transmitting, from said HLR to said V-MSC, a routing request message having a forward service indicator code, upon determining that said incoming call invokes an alert-and-answer-before-routing feature; and receiving, in said V-MSC, the routing request message having the forward service indicator code.

3. The method of delivering an incoming call to a called mobile station in a radio telecommunication system of claim 1 wherein said step of informing said V-MSC that said incoming call invokes an alert-and-answer-before-routing feature includes the steps of:

determining, within said originating MSC, whether said incoming call invokes an alert-and-answer-before-routing feature;

transmitting, from said originating MSC to said HLR, a location request message which includes a forward service indicator code;

transmitting, from said HLR to said V-MSC, a routing request message which includes the forward service indicator code, upon determining that said incoming call invokes an alert-and-answer-before-routing feature; and receiving, in said V-MSC, the routing request message including the forward service indicator code.

4. The method of delivering an incoming call to a called mobile station in a radio telecommunication system of claim 1 wherein said step of informing said V-MSC that said incoming call invokes an alert-and-answer-before-routing feature includes the steps of:

programming said V-MSC to recognize that every long distance call invokes said alert-and-answer-before-routing feature; and informing said V-MSC that said incoming call is a long distance call.

5. The method of delivering an incoming call to a called mobile station in a radio telecommunication system of claim 1 further comprising, after the step of informing said V-MSC that said incoming call invokes an alert-and-answer-before-routing feature, the steps of:

paging, from said V-MSC, the called mobile station;

receiving, in said V-MSC, a paging response from the called mobile station; and seizing a voice channel between said V-MSC and said called mobile station.

6. The method of delivering an incoming call to a called mobile station in a radio telecommunication system of claim 1 further comprising, after the step of transmitting a delayed connection message, the step of transmitting, from said V-MSC to said HLR, a routing number for said called mobile station.

7. A method of delivering an incoming call to a called mobile station in a radio telecommunication system having an originating mobile switching center (MDS), a home location register (HLR), and a visited mobile switching center (V-MSC) in which said called mobile station is operating, said method comprising the steps of:

receiving said incoming call in said originating MSC;

transmitting, from said originating MSC to said HLR, a location request message requesting a location of said called mobile station;

determining, within said HLR, whether said incoming call invokes an alert-and-answer-before-routing feature;

transmitting, from said HLR to said V-MSC, a routing request message having a forward service indicator code, upon determining that said incoming call invokes an alert-and-answer-before-routing feature;

receiving, in said V-MSC, the routing request message having the forward service indicator code;

paging, from said V-MSC, the called mobile station prior to routing the call to the V-MSC;

receiving, in said V-MSC, a paging response from the called mobile station;

seizing a voice channel between said V-MSC and said called mobile station;

transmitting an alerting signal from said V-MSC to said called mobile station prior to routing the call to the V-MSC;

transmitting, from said V-MSC to said called mobile station, a delayed connection message when said called mobile station answers said alerting signal, and prior to routing the call to the V-MSC;

transmitting, from said V-MSC to said HLR, a routing number for said called mobile station; and routing said incoming call to said called mobile station.

8. A method of notifying a called mobile station of a delayed incoming call within a radio telecommunication system having an originating exchange having a home location register (HLR) and an originating mobile switching center (MSC), a plurality of visited mobile switching centers (V-MSCs), and a plurality of mobile stations, each one of said plurality of mobile stations being assigned to a single pilot directory number (PDN), wherein said HLR maintains a list of parameters identifying each V-MSC in which at least one mobile station identified with the PDN is believed to be currently located, said method comprising the steps of:

receiving a call directed to the PDN in the HLR of the originating exchange;

transmitting, from said HLR, a individual routing request message having a forward service indicator code to each one of said identified V-MSCs;

receiving, in each identified V-MSC, the routing request message having the forward service indicator code;

paging, from each identified V-MSC, each identified mobile station located therein prior to routing the call;

receiving, in at least one of said identified V-MSCs, a paging response from at least one of said identified mobile stations located therein;

seizing a voice channel between each identified V-MSC receiving a page response and said at least one responding mobile station located therein;

transmitting an alerting signal from each receiving identified V-MSC to said at least one responding mobile station located therein prior to routing the call;

determining which of said at least one responding mobile stations answered said alerting signal;

transmitting, from each receiving identified V-MSC, a delayed connection message to said at least one answering mobile station located therein prior to routing the call;

transmitting from each V-MSC having at least one answering mobile station, a routing number for said at least one answering mobile station to said HLR; and selectively routing said incoming call to one of said answering mobile stations.

9. The method of noting a called mobile station of a delayed incoming call within a radio telecommunication system of claim 8 further comprising releasing said voice channels between each identified V-MSC and said mobile stations that were not selected for routing said call.

10. The method of notifying a called mobile station of a delayed incoming call within a radio telecommunication system of claim 9 further comprising, before releasing said voice channels between each identified V-MSC and said mobile stations that were not selected for routing said call, the step of transmitting, from each receiving identified V-MSC, a message to said mobile stations that were not selected for routing said call, said message stating that said incoming call has been routed to another mobile station.

11. The method of notifying a called mobile station of a delayed incoming call within a radio telecommunication system of claim 8 wherein said step of transmitting, from each receiving identified V-MSC, a delayed connection message to said at least one answering mobile station includes repeatedly transmitting said delayed connection message while said incoming call is delayed.

12. The method of notifying a called mobile station of a delayed incoming call within a radio telecommunication system of claim 11 wherein said step of repeatedly transmitting said delayed connection message while said incoming call is delayed includes stopping the transmission of said delayed connection message when said incoming call is routed to one of said answering mobile stations.

13. The method of notifying a called mobile station of a delayed incoming call within a radio telecommunication system of claim 8 further comprising the step of transmitting, from said originating MSC to the HLR of the originating exchange, a location request message which includes the forward service indicator code.

* * * * *